US007007013B2

(12) United States Patent
Davis, II et al.

(10) Patent No.: US 7,007,013 B2
(45) Date of Patent: Feb. 28, 2006

(54) FAST COMPUTATION OF SPATIAL QUERIES IN LOCATION-BASED SERVICES

(75) Inventors: John Sidney Davis, II, New York, NY (US); Daby Mousse Sow, Riverdale, NY (US)

(73) Assignee: International Business Machines Corporation, Armonk, NY (US)

( * ) Notice: Subject to any disclaimer, the term of this patent is extended or adjusted under 35 U.S.C. 154(b) by 553 days.

(21) Appl. No.: 10/207,683

(22) Filed: Jul. 26, 2002

(65) Prior Publication Data

US 2004/0019581 A1    Jan. 29, 2004

(51) Int. Cl.
 *G06F 17/30* (2006.01)
(52) U.S. Cl. .......................................... 707/3; 707/100
(58) Field of Classification Search ............... 707/2–5, 707/100, 103 R–103 Z, 104.1
See application file for complete search history.

(56) References Cited

U.S. PATENT DOCUMENTS 5,428,726 A * 6/1995 Piegl et al. ................. 345/441
6,029,162 A * 2/2000 Schultz ........................ 707/2
6,134,556 A * 10/2000 Shin ......................... 707/102

OTHER PUBLICATIONS

C. Wang and L. Schubert, "An Optimal Algorithm for constructing the Delaunay triangulation of a set of line segments", ACM, proceedings of the third symposium on Computational geometry, Oct. 1987, pp. 223-232.*

* cited by examiner

*Primary Examiner*—Greta Robinson
*Assistant Examiner*—Cheryl Lewis
(74) *Attorney, Agent, or Firm*—Louis P. Herzberg

(57) ABSTRACT

This invention provides methods, systems and apparatus for performing fast computation of metric queries. To achieve this, in an example embodiment, the present invention segments metric regions into disjoint primitive atomic shapes. It then represents these primitive atomic shapes and then performs off-line computation of their relevant properties. As a result of the off-line computation, the execution of a query requires a minimal number of on-line calculations resulting in a very fast query. Further optimization occurs via storage of query histories and prioritization of queries with respect to the access frequency of a metric space's primitive atomic shapes.

33 Claims, 8 Drawing Sheets

FAST COMPUTATION OF SPATIAL QUERIES IN LOCATION-BASED SERVICES

FIELD OF THE INVENTION

This invention is directed to the field of computational, location-based services. It is more particularly directed to the solution of spatial queries about geographical regions.

BACKGROUND OF THE INVENTION

A service that takes geographical location into account is referred to as a location-based service. Location-based services are particularly compelling in a mobile computing context in which the location of clients and services is constantly changing. Herein lies the opportunity to connect appropriate clients and services based on their respective locations. Example applications include emergency medical services that automatically dispatch the closest ambulance based on the location of the initiating phone call, restaurant directory systems that allow a user to search for the nearest restaurant of a given type and message delivery systems that automatically route electronic messages to a recipient as his/her location varies. Location-based services are an important component of a pervasive computing infrastructure.

Location-based services are at the intersection of several important industries, including but not limited to global position satellite (GPS) technology and mobile communication networks. These two industries provide a framework for supporting location-based services. Trends in these industries make it clear that location-based services will be an increasingly important offering in the near future.

A critical feature of location-based services is the ability to perform spatial queries about geographical regions. I.e., to determine the physical location of computational clients and services with respect to geographical regions. Spatial queries are necessary in facilitating the interaction between a user and a ubiquitous computing system so that a user can determine where computational resources are located. There are two fundamental types of spatial queries: firstly, a determination of what objects are in a region, and secondly, a determination of which region includes one or more objects. The first is herein referred to as the "what is there?" question, as in "what objects are contained within a given geographical region?". The second is referred to herein as the "where is it?" question as in "what geographical region contains a given object?".

Spatial queries are a special case of metric queries. A metric space is a set of elements in which there is defined a distance between any pair of elements in the set. Metric queries compare the relative distances of elements in a metric space where elements in the set include regions. Spatial queries are metric queries in which the units of distance measurements include feet, miles, meters, kilometers, or such, and in which regions are geographical regions. As with spatial queries, metric queries include both "what is there?", and "where is it?" queries.

SUMMARY OF THE INVENTION

One aspect of the present invention provides fast algorithms for the evaluation of metric queries including both the "what is there?" as well as the "where is it?" queries. Example embodiments of these fast algorithms include algorithms for evaluation of spatial queries.

Another aspect of the present invention is to employ a convenient way to represent geographical regions as two dimensional objects. This allows leveraging existing work in the fields of computer vision and computer graphics. In particular we leverage the work on region segmentation which breaks a region into disjoint components.

DEFINITIONS

As used herein:
Region: is a non-empty set of connected boundary points.
Container region: is any region for which a determination is made as to whether it contains another region.
Containee region: is any region for which a determination is made as to whether it is contained in another region.
Atomic shape: is a region which does not require additional partitioning in order to undergo off-line computation.
Hit rate: is the rate of success for which a particular atomic shape satisfies a query.
Group of numerical relationships includes: a graph; an image; at least one equation; a function; or a combination of these.
Region computation: is the total computation necessary to evaluate a metric query about a given region.
Region complexity: is the computational complexity of a corresponding region computation.
Off-line computation: is the part of region computation that processes just the container region.
On-line computation: is the part of region computation that processes both the container and containee region.
Static property: is an attribute that does not depend on metric query or containee region parameters.
Metric space: is a set of elements in which there is defined a distance between any pair of elements in the set.
Metric query: is a comparison of the relative distances of sets (and/or elements) in a metric space including container regions and containee regions.
Spatial query: is a metric query in which the units of distance measurements include feet, miles, meters or kilometers, or such, and in which regions are geographical regions.

BRIEF DESCRIPTION OF DRAWINGS

The advantages and features of the present invention will become more apparent by the following description of the advantageous embodiment of the present invention, with reference to the drawings, in which.

DESCRIPTION OF THE INVENTION

The present invention provides methods, systems and apparatus for fast computation of metric queries. Metric queries are generally computationally complex. This is due in part to irregularly shaped geographical regions. Consider a spatial query about Westchester County, N.Y. Even a poor approximation of the Westchester County boundaries requires a complex polygonal representation. Asking the "what is there?" question requires a system to compare the coordinates of an object with each boundary segment of the geographical region. Such comparisons can be very time consuming in a heavily used system. Just as it is important that web page requests occur quickly, a successful ubiquitous computing system will require minimal latency for metric queries.

To reduce the latency of metric queries the associated computational steps are partitioned into two groups: off-line computations and on-line computations. Metric query latency is due only to on-line computation time as off-line computation occurs prior to the occurrence of a metric query. Our overall approach performs as much computation as possible off-line. The result is that the remaining on-line computation is minimized. To reduce latency further embodiments are described employing techniques for optimizing the on-line computation.

An example embodiment of a method which achieves this, includes the following steps:

1. Segmentation of metric regions into disjoint primitive atomic shapes.
2. Representation and off-line computation of the relevant properties of each primitive atomic shape.
3. On-line computation of metric queries based on query history, by starting from the most queried atomic shapes.
4. Update of the query history for each atomic shape.

As a result of this approach, metric query latency is due to on-line computation time as off-line computation occurs prior to the occurrence of a metric query. Our overall approach performs as much computation as possible off-line in steps 1 and 2. The result is that the remaining on-line computation is minimized. To reduce latency further, we store and use query history to order the queries performed on each atomic shape, as described in step 3 and 4.

Figure 1:
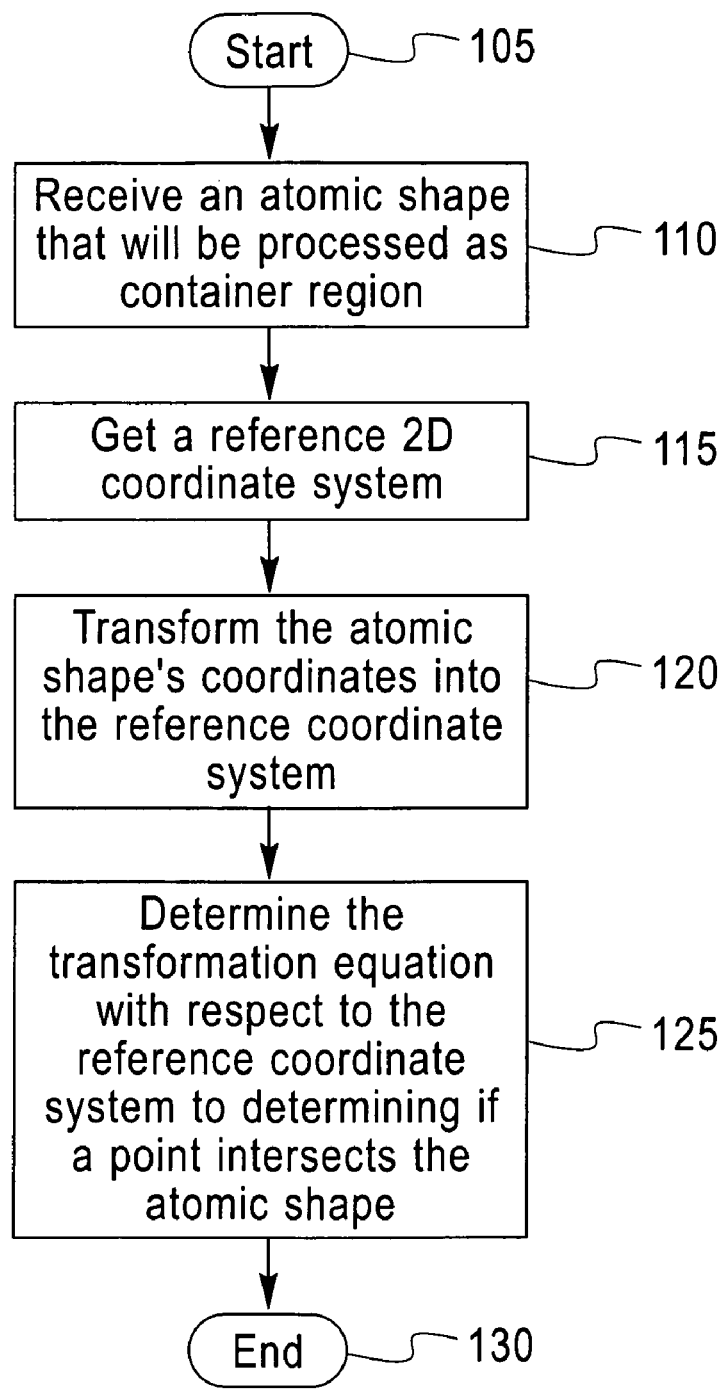
FIG. 1 shows an example of a generic algorithm for performing off-line computations for arbitrary atomic shapes.

An example of an off-line computation algorithm is shown in FIG. 1. This algorithm starts 105 by receiving 110 an atomic shape that is to be processed as a container region. For a given set of atomic shapes, the algorithm selects 115 a single reference 2D coordinate system. It then transforms 120 the atomic shape's coordinates into equivalent coordinates in the reference 2D coordinate system. The algorithm then determines 125 the transformation equation with respect to the reference 2D coordinate system for determining if a point is included in the atomic shape.

Figure 2:
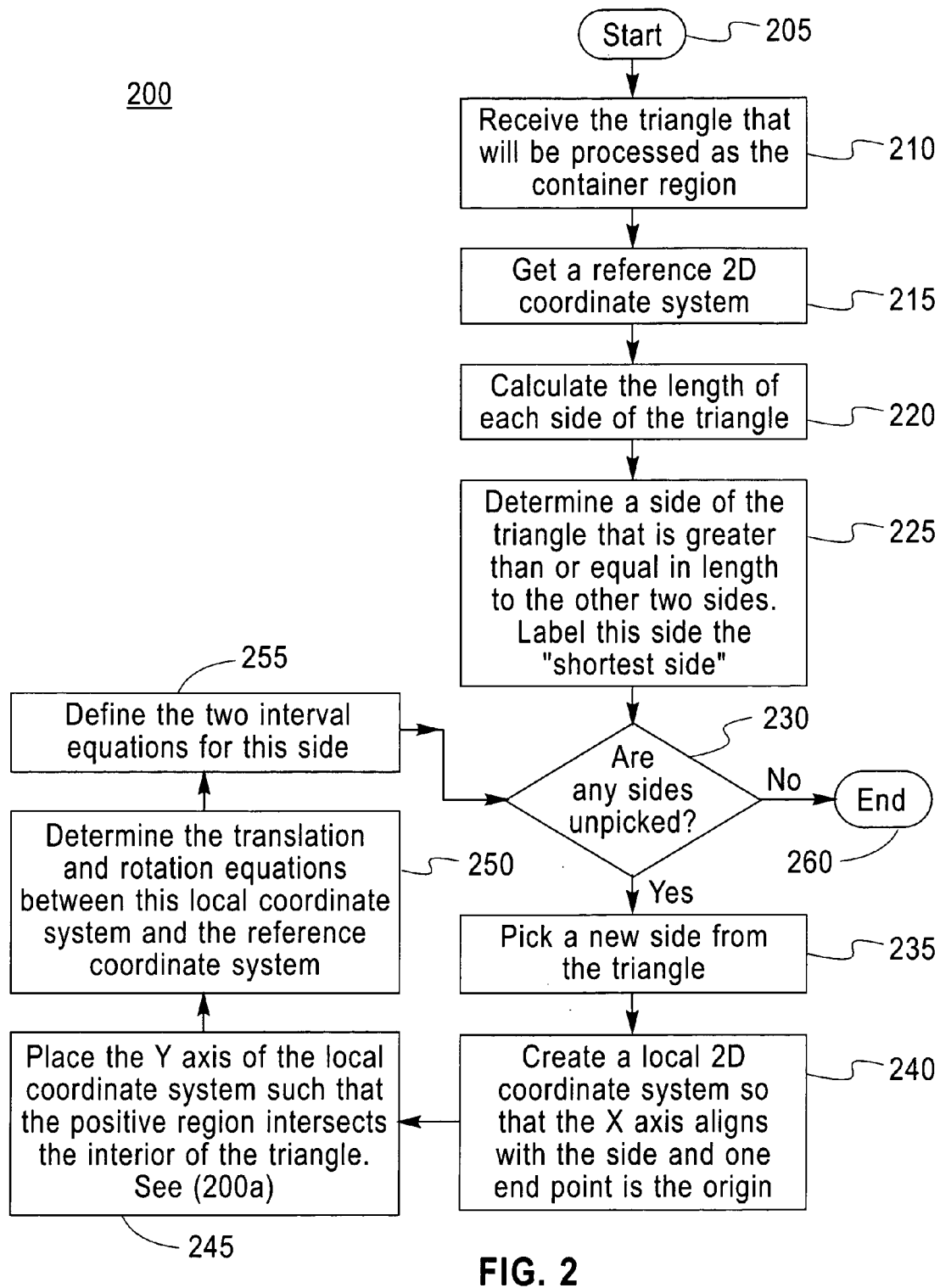
FIG. 2 shows an example of an algorithm for performing off-line computations including determination of the rotation and translation equations for triangular atomic shapes.
Figure 2A:
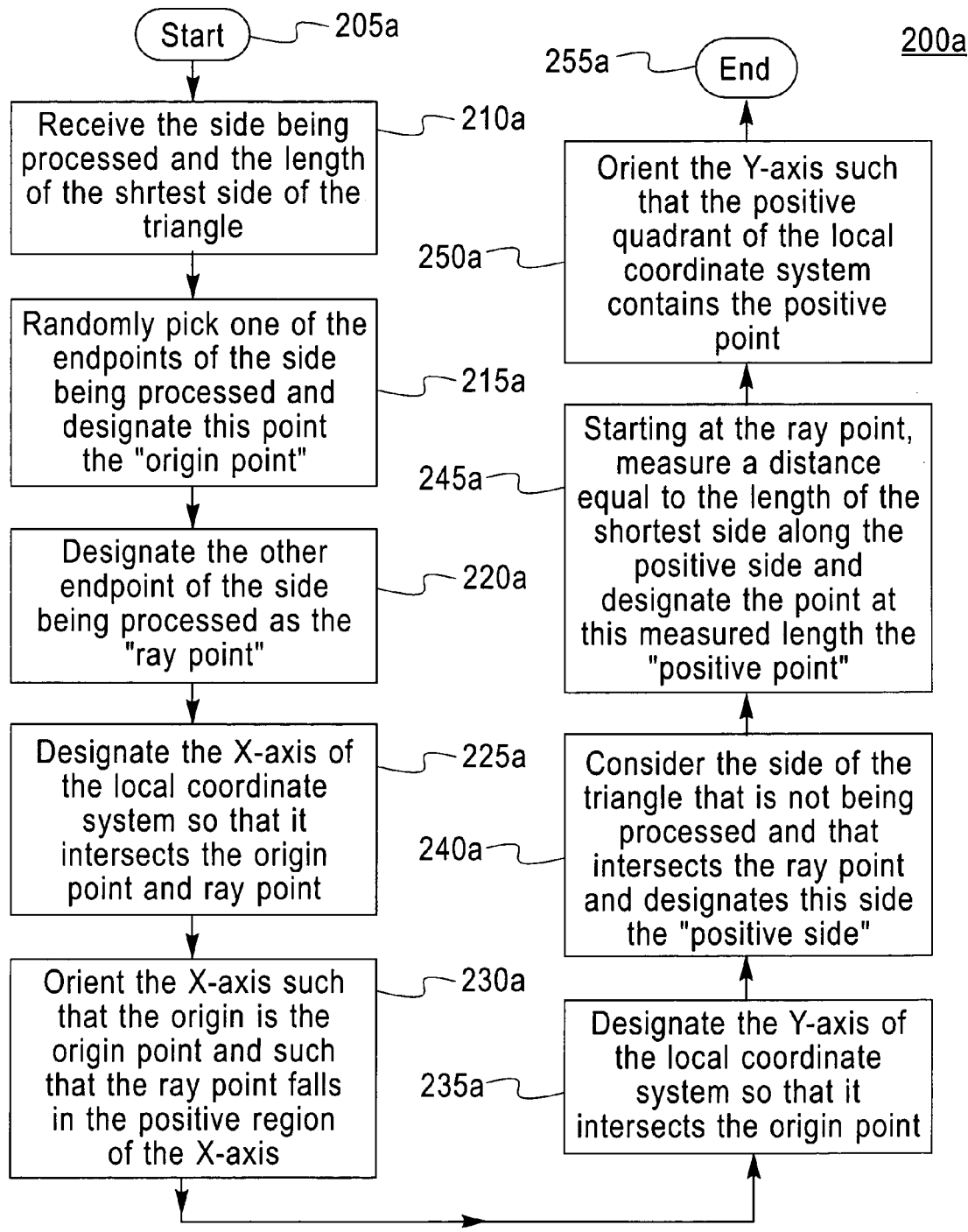
FIG. 2a shows an example of an algorithm for performing off-line computations including determination of the local coordinate system for each side of a triangular atomic shape.

An example embodiment of an off-line computation in which atomic shapes are triangular shapes is shown in FIGS. 2 and 2a. This algorithm starts 205 by receiving 210 the triangular atomic shape that will be processed as the container region. The system gets 215 the reference 2D coordinate system and calculates 220 the length of each side of the triangular atomic shape. The algorithm determines 225 a side of the triangle that is less than or equal in length to the other two sides and labels this side the "shortest side." The next step tests 230 if there are any unpicked sides of the triangular atomic shape. Unpicked sides are sides of the triangle for which a translation and rotation equation have not been generated. If there are unpicked sides left, the procedure picks 235 one such side from the triangle. The algorithm then creates 240 a local 2D coordinate system so that the X-axis aligns with the side and one end point of the origin. The algorithm then places 245 the Y-axis of the local coordinate system such that the local 2D coordinate the positive region intersects the interior of the triangle (see FIG. 2a for a further explanation of the step associated with 245). The algorithm then determines 250 the translation and rotation equations between this local coordinate system and the reference coordinate system. The algorithm then defines 255 the two interval comparison equations for this side. Once there are no unpicked sides the algorithm completes 260.

FIG. 2a gives an algorithm for determining how to orient a local 2D coordinate system. The algorithm starts 205a by receiving 210a the side being processed, and the length of the shortest side of the triangle. The algorithm then arbitrarily picks 215a one of the endpoints of the side being processed and designates this point the "origin point." The next step designates 220a the other endpoint of the side being processed as the "ray point." The algorithm then designates 225a the X-Axis of the local coordinate system so that it intersects the origin point and the ray point. The algorithm then orients 230a the X-Axis such that the origin of the X-Axis is the origin point and such that the ray point falls in the positive region of the X-Axis. Next the algorithm designates 235a the Y-Axis of the local coordinate system so that it intersects the origin point. The algorithm then considers the side of the triangle that is not being processed and that intersects the ray point and designates 240a this side the "positive side." Starting at the ray point, the algorithm measures 245a a distance equal to the length of the shortest side along the positive side and designates the point at this measured length the "positive point." Next the algorithm orients 250a the Y-Axis such that the positive quadrant of the local coordinate system includes the positive point after which the algorithm is complete 255a.

Figure 3:
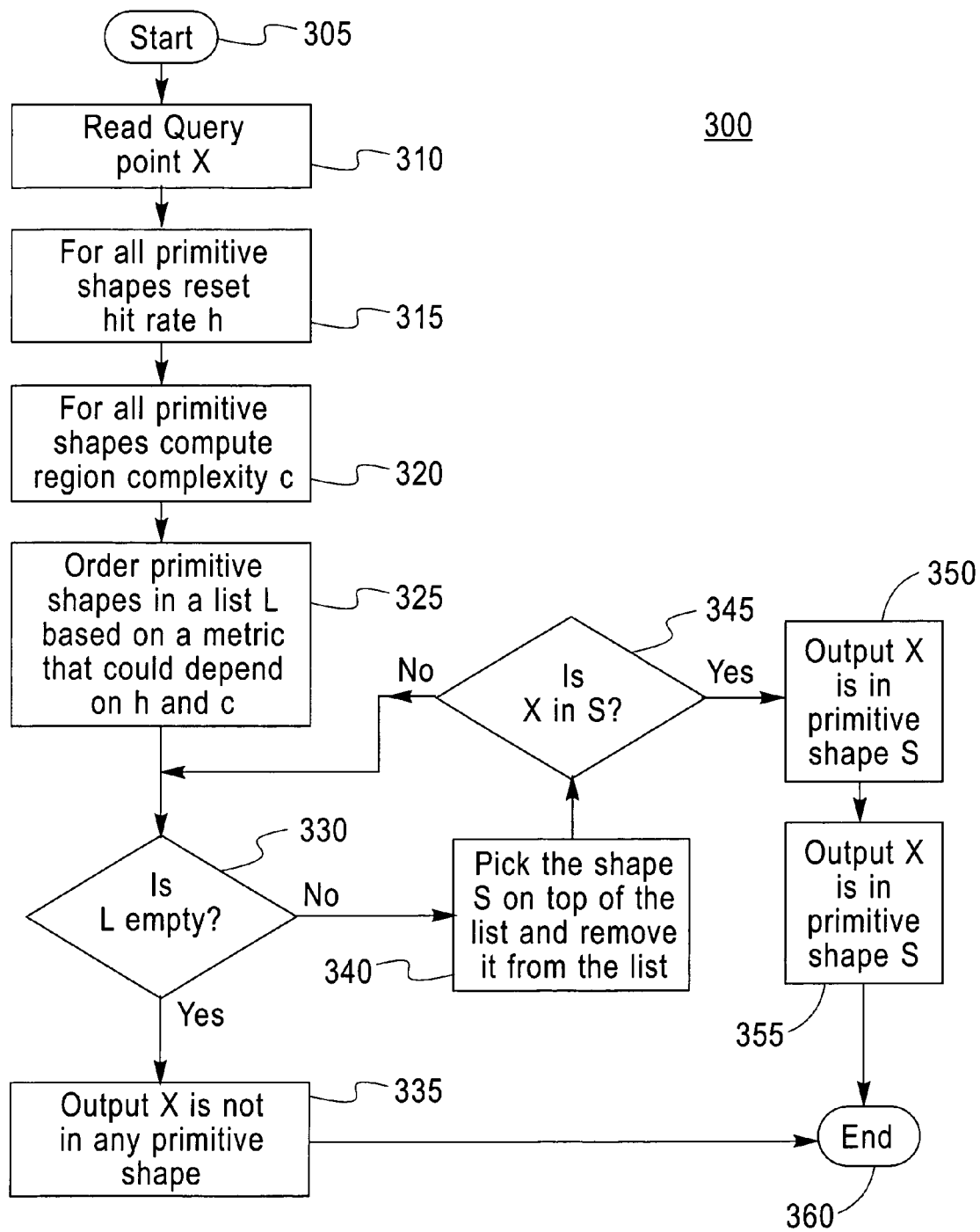
FIG. 3 shows an example of an algorithm for performing on-line computations and the prioritization of atomic shape queries.
Figure 4:
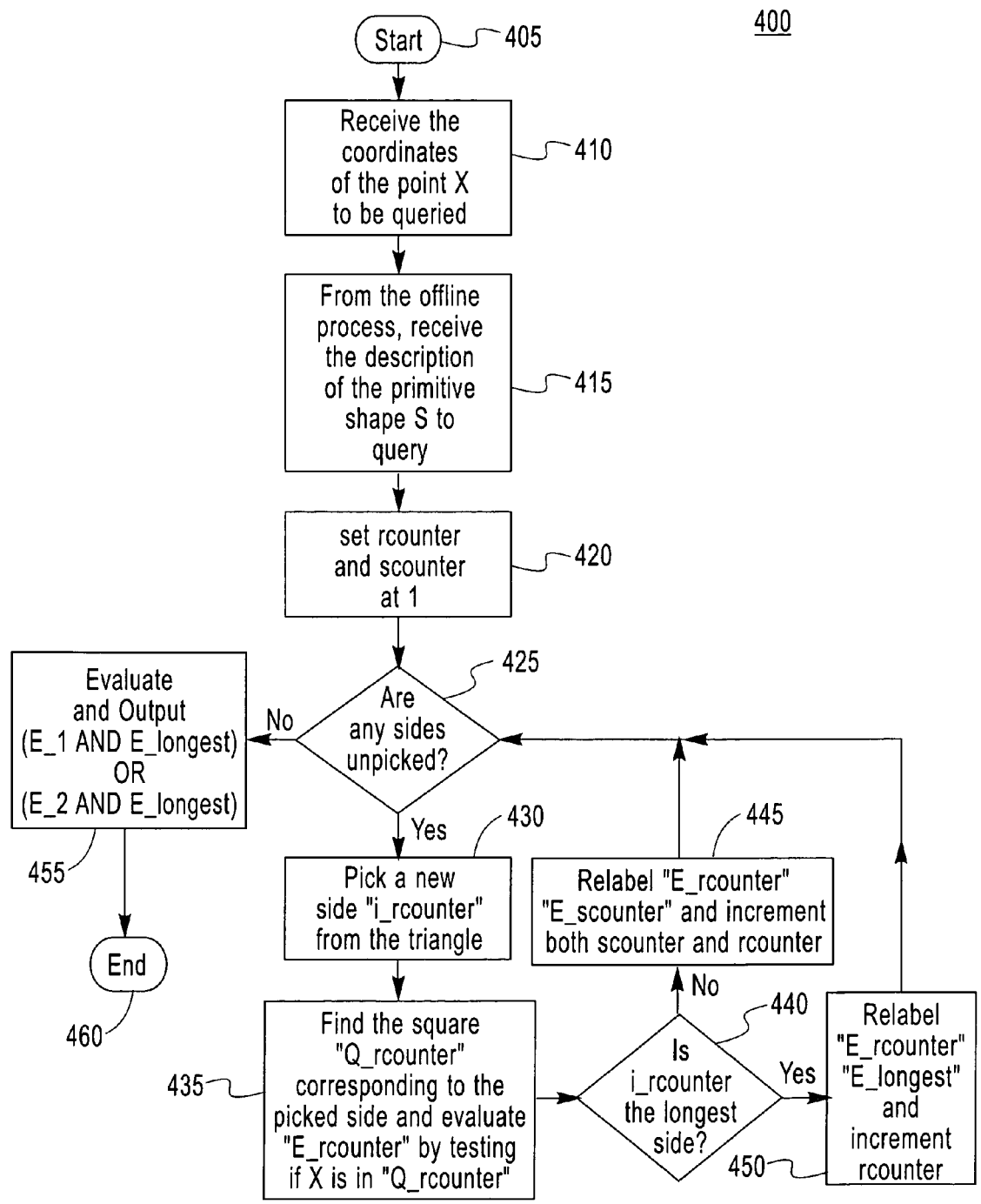
FIG. 4 shows an example of an algorithm for performing on-line computations related to queries with respect to a single triangular atomic shape.

An example of an on-line computation algorithm is shown in FIG. 3. This algorithm starts 305 by reading 310 a point X to be located in the atomic shapes obtained from the off-line algorithm described in FIG. 1. For all primitive shapes, the algorithm resets 315 the hit rate h and computes 320 their region complexity c. It then orders primitive shapes in a list L based on a metric that could depend on h and c. For example, a metric could place atomic shapes in L in a descending order of hit rate h. Another metric could place atomic shapes in L in a descending order of product hc. The algorithm then checks 330 if the list L is empty or not. If L is not empty, it picks 340 the shape S on top of L and remove it from L. It tests 345 if the point X is in S by invoking the procedure described in FIG. 4. The steps in this procedure are described below. If X is in S, the algorithm updates 350 the hit rate h associated to S and then outputs 355 "X is in primitive shape S" with a description of S. It then ends the computation. If the procedure described in FIG. 4 replies that X is not in S, the algorithm goes back to step 330 where it tests whether L is empty or not. If L is not empty, it repeats steps 340 and 345. If L is empty, the algorithm outputs 335 "X is not in any primitive shape" before ending 360 its computation.

Figure 5:
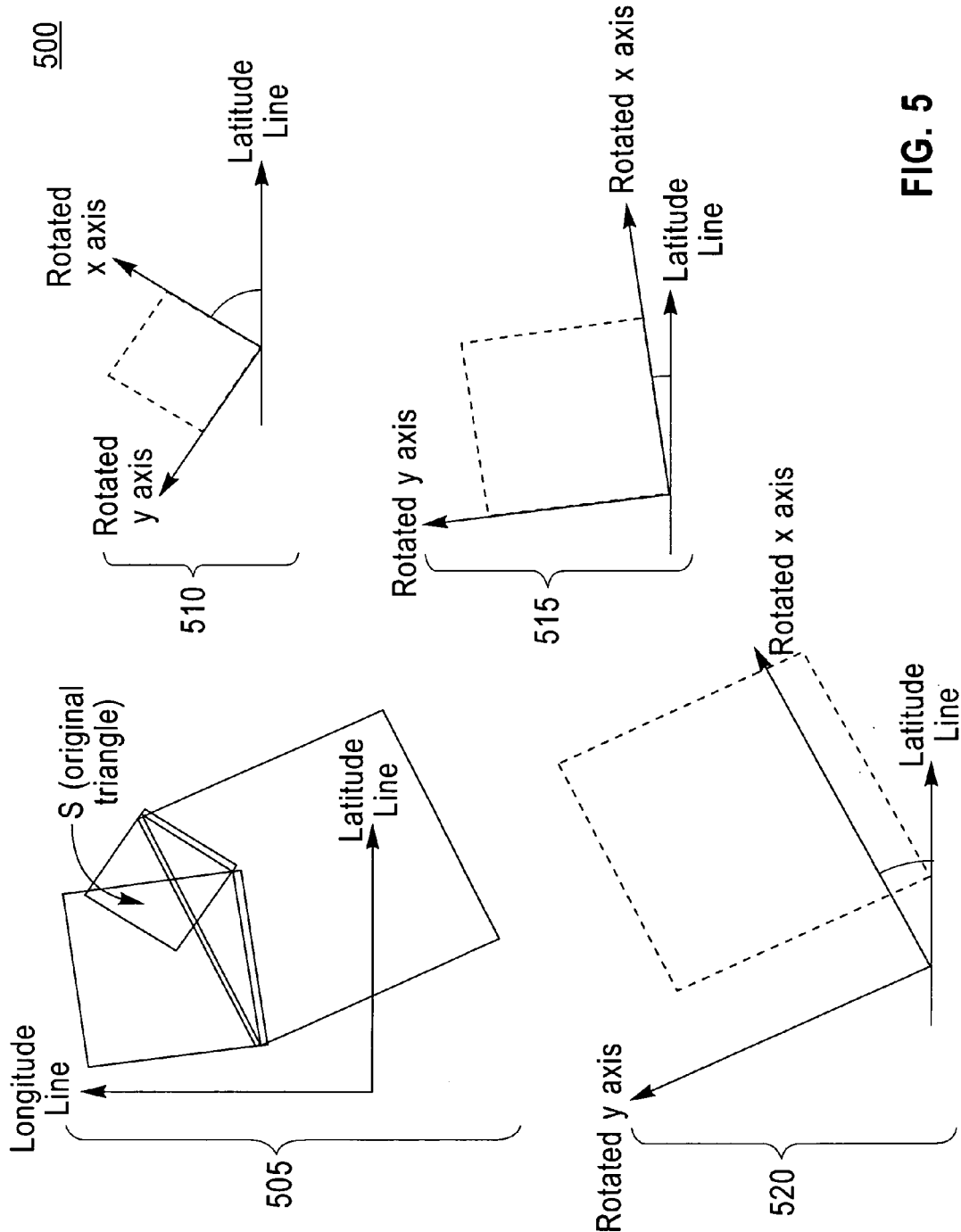
FIG. 5 is used to explain the rationality behind the use of squares to represent triangles for metric queries.

As mentioned above, FIG. 4 describes a procedure that tests whether a given point X is inside a given primitive shape S for triangular primitive shapes. It starts 405 by reading 410 the coordinates of the point X. From the off-line process described in FIGS. 1 and 2, it receives 415 a complete description of the primitive shape S to query. It then sets 420 two counters "rcounter" and "scounter" to 1. The next step tests 425 if there are any unpicked sides of S. Unpicked sides are simply sides that the procedure has not used yet to generate a response to the query "Is X in S?". If there are unpicked sides left, the procedure picks 430 a side and labels it "i_rcounter", rcounter being the current value of the counter rcounter. It then finds 435 the square Q_rcounter corresponding to the picked side and tests 435 whether X is in Q_rcounter. The Boolean result of this tests is stored in E_rcounter. Testing whether X is in Q_rcounter involves a rotation and a translation. The off-line computation simplifies the translation and rotation because the properties (sine and cosine) of the angle involved in the rotation have already been computed ahead of time and expressed in the translation and rotation equation obtained in step 250, as described in FIG. 2. If i_rcounter is the longest side 440 of the triangle, the procedure re-labels 450 the results of the evaluation E_rcounter with E_longest and increments rcounter. If i_rcounter is not the longest side of the triangle, the algorithm re-labels 445 E_rcounter with E_scounter and increments both rcounter and scounter. From step 450 and 445, the algorithm goes back to step 425 where it checks if there are any unpicked sides left. If there are more unpicked sides left, it repeats steps 430, 435 and 440. If the test in step 425 indicates that there are no more unpicked sides left, the algorithm proceeds to step 455 where it evaluates the following Boolean formula: (E__1 AND E_longest) OR (E__2 AND E_longest). If this evaluation is true, the procedures returns true: X is in S. If the evaluation is false, the procedure returns false: X is not in S. FIG. 5 describes the rationality behind the proposed Boolean formula. It clearly shows that for a point X to be inside a primitive shape S 505, the proposed Boolean formula must return true. Furthermore, it will return true only for points X inside S.

Figure 6:
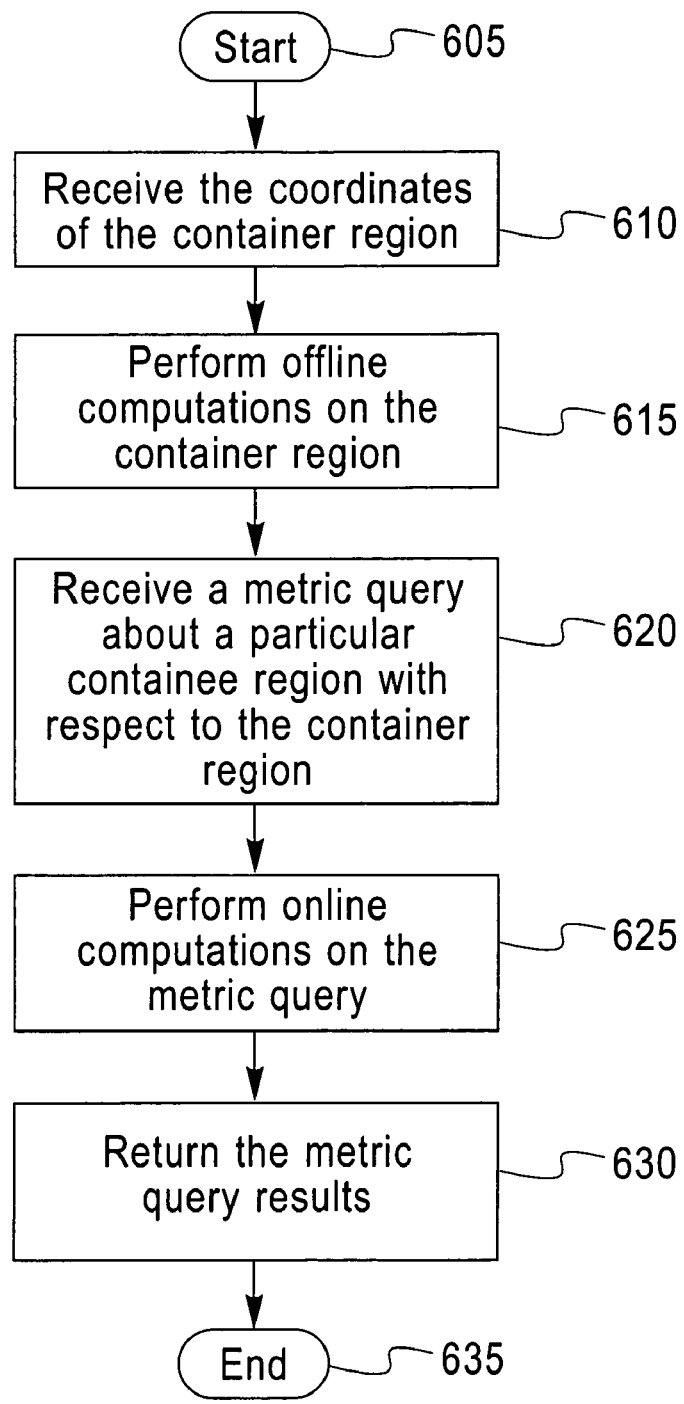
FIG. 6 describes an overall algorithm that includes both off-line and on-line steps.

A further example embodiment of the present invention is shown in FIG. 6. The system starts 605 by receiving 610 coordinates of a container region prior to a metric query. The system then performs 615 off-line computations on the container region and stores the results. The system is then ready to receive 620 a metric query about a particular containee region with respect to the container region. The system then performs 625 on-line computations on the metric query using the corresponding stored off-line computation results. After the on-line computation is complete the system returns 630 the metric query results and the system execution completes 635 for that particular metric query.

Thus an example embodiment of the invention includes a method for preparing a representation of a region in anticipation of a query related to a metric space The representation is used to form a response to a received query. The method further includes the steps of: obtaining a mathematical format of a region within the metric space, disaggregating the region into a set of atomic shapes, and forming the representation of the region by preprocessing and storing at least one property for at least one of the atomic shapes.

In some realizations, the method may include transforming the mathematical representation of the atomic shapes into a sequence of vertices. The method may also include the formation of a response to the query employing the mathematical representation. The method may also include prioritizing the atomic shapes according to a prioritization criterion where prioritization criteria include such criterion as hit rate and region complexity.

In some embodiments, the query could be a spatial query. The mathematical format can include a group of numerical relationships between the components of the spatial regions related to the query. The atomic shapes could include circles, triangles, rectangles, cubes, pyramids, spheres or any combination of these or other shapes.

For example, to disaggregate the spatial region into atomic shapes, the Delauney triangulation algorithm can be used. In this case, atomic shapes are all triangles and the preprocessing steps include the definition of a reference coordinate system and also the definition of local coordinate systems for each atomic shape. An angle of rotation for each side of the triangles with respect to the defined reference coordinate system is then computed. The end points of each sides of these triangles are then transformed into the reference coordinate system. This transformation is a rotation that is defined by a matrix with elements that are computed ahead of time using trigonometry and the computed angles of rotation. When the atomic shapes are circles, the preprocessing steps include the computation of the center and radius of each circle.

To form a response to queries, some embodiments compute a rank for each atomic shape, order these shapes based on this rank, and query each atomic shape according to that order. The rank used here could be based on criteria including, the region complexity of the atomic shape, the hit rate of the shape, any combination of these or other ranking criterion.

An-other example-embodiment for this invention includes a method for preparing and/or providing a response to an anticipated or received spatial query using the following steps: forming an efficient representation of locations of a plurality of geographical regions decomposed into atomic shapes, preparing and/or providing a response to the anticipated or received spatial query by determining whether a point location intersects at least one of the geographical regions and finding the intersection of these geographical regions.

In some embodiments of this method, the step of forming efficient representation of regions disaggregated into atomic components includes segregating computations into an off-line and on-line computations. Sometimes, the off-line computations are employed to capture at least one property of the atomic component. Furthermore, sometimes the atomic components are formed into triangles based on Delaunay triangulation such that orientation of triangular regions with respect to a fixed axis are efficiently calculated via off-line computation. Sometimes, the triangular atomic components are stored as three orientation angles and three line segments.

In some embodiments, the invention is provided as an article of manufacture comprising a computer usable medium having computer readable program code means embodied therein for causing provision of a response to a metric query. The computer readable program code means in the article of manufacture comprising computer readable program code means for causing a computer to effect the steps of the methods of the invention.

In some embodiments, the invention is provided as a program storage device readable by machine, tangibly embodying a program of instructions executable by the machine to perform method steps for provision of a response to a metric query, such that the method steps comprise the steps of any method of the present invention.

A still further example embodiment, the invention includes an apparatus having means for preparing a representation of a region in anticipation of a query related to a metric space. The representation is used in forming a response to the metric space query. The apparatus also includes means for obtaining a mathematical format of a region within the metric space, means for disaggregating the region into a set of atomic shapes and means for forming the representation of the region by preprocessing and storing at least one property for at least one of the atomic shapes.

In some cases the apparatus includes means for transforming the mathematical representation of the atomic shapes into a sequence of vertices. The apparatus may also include means for the formation of a response to the query employing the mathematical representation. The apparatus may also include means for prioritizing the atomic shapes according to a prioritization criterion where prioritization criteria include such criterion as hit rate and region complexity.

Figure 7:
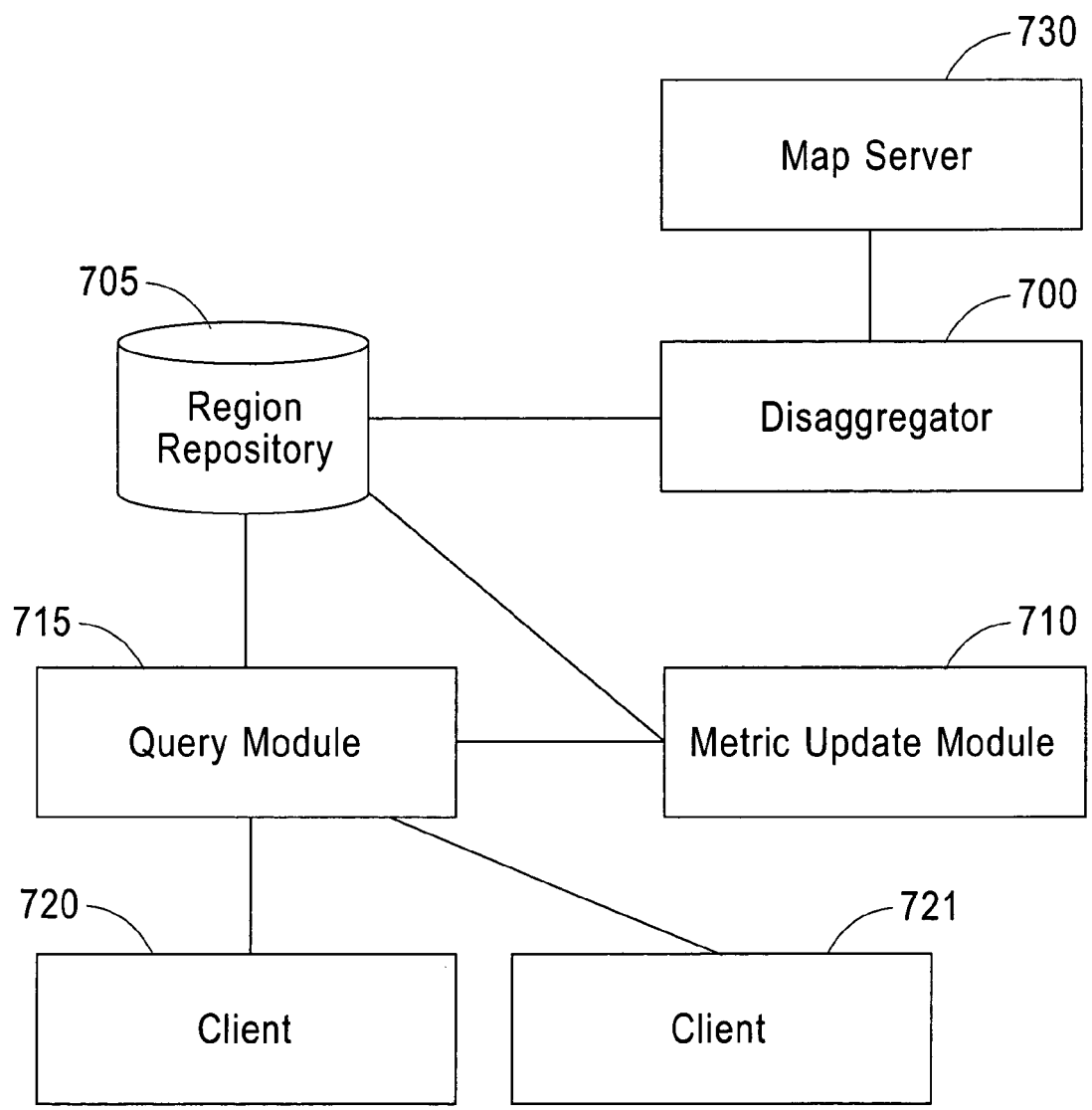
FIG. 7 describes an example diagram of an apparatus implementing the method described herein.

An example of an apparatus that implements the method described herein is shown in FIG. 7. The disaggregator 700 receives mathematical representations of regions from an external map server 730 and performs off-line computation by disaggregating the region into atomic shapes and associating static properties with each atomic shape as well as initialized prioritization criteria. The atomic shapes and their static properties are stored in the region repository 705. Clients 720–721 send metric queries to the query module 715. The query module 715 performs on-line computation on the metric queries by accessing disaggregated regions from the region repository 705 and then sends a response to the clients 720–721. The prioritized criteria can be updated by the metric update module 710 before placing the disaggregated region back into the region repository 705.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. Thus, the invention may be implemented by an apparatus including means for performing the steps and/or functions of any of the methods used for carrying out the concepts of the present invention, in ways described herein and/or known by those familiar with the art. The described embodiments ought to be construed to be merely illustrative of some of the more prominent features and applications of the invention. Other beneficial results can be realized by applying the disclosed invention in a different manner or modifying the invention in ways known to those familiar with the art.

Having thus described our invention, what we claim as new and desire to secure by Letters Patent is as follows:

1. A method comprising:
    preparing, in anticipation of a query related to a metric space, a representation of a region to be used in forming a response to said query, said method further including the steps of:
    obtaining a mathematical format of said region within said metric space;
    disaggregating said region into a set of atomic shapes; and
    forming the representation of said region by preprocessing and storing at least one property for at least one of said atomic shapes.

2. A method as recited in claim 1, further comprising prioritizing said atomic shapes according to at least one prioritization criterion.

3. A method as recited in claim 2, wherein said at least one criterion includes a hit rate.

4. A method as recited in claim 2, wherein said prioritization criteria is taken from a group of prioritization criteria including hit rate and region complexity.

5. A method as recited in claim 1, wherein said query is a spatial query.

6. A method as recited in claim 1, further comprising transforming said mathematical format into a sequence of vertices.

7. A method as recited in claim 1, further comprising including in the mathematical format a group of numerical relationships between components of said region.

8. A method as recited in claim 1, wherein each of said atomic shapes is a shape included in a group of shapes including: a circle; a triangle; a rectangle; a cube, a pyramid, a sphere, and any combination of these.

9. A method as recited in claim 1, wherein the step of disaggregating includes employing a Delauney triangulation algorithm.

10. A method as recited in claim 1, wherein the step of preprocessing includes:
establishing and applying at least one reference coordinate system to said atomic shapes;
identifying at least one property of each of said atomic shapes; and
transforming said at least one property into a format consistent with said at least one reference coordinate system.

11. A method as recited in claim 10, wherein the atomic shapes are triangles and the step of preprocessing includes:
calculating an angle of rotation for each side of said triangles with respect to one reference coordinate system from said at least one reference coordinate system; and
transforming endpoints of each side of said triangle into said one reference coordinate system.

12. A method as recited in claim 11, wherein the step of transforming includes creating trigonometric coefficients of the angles of rotation for each side of said triangles with respect to said one reference coordinate system.

13. A method as recited in claim 1, wherein at least one of said atomic shapes is a circle, and the step of preprocessing includes calculating a center and radius of each circle.

14. A method as recited in claim 1, wherein said at least one property includes at least one static property.

15. A method as recited in claim 1, wherein said metric space includes regions with curved boundaries and regions with straight line boundaries, and wherein said atomic shapes include at least one atomic shape with a curved boundary and at least one atomic shape with a straight line boundary.

16. A method as recited in claim 1, further comprising forming a response to said query employing said representation.

17. A method as recited in claim 16, wherein the step of forming a response to said query employing said representation, includes:
computing for each atomic shape a rank;
forming said atomic shapes into an ordered list having a list order based on said rank of said each atomic shape; and
querying atomic shapes in the list order given in said ordered list.

18. A method as recited in claim 17, wherein said rank is based on at least one rank criterion wherein said rank criterion is taken from a group of criteria including: hit rate, region complexity, and any combination of these.

19. An article of manufacture comprising a computer usable medium having computer readable program code means embodied therein for causing representation of a region, the computer readable program code means in said article of manufacture comprising computer readable program code means for causing a computer to effect the steps of claim 1.

20. A program storage device readable by machine, tangibly embodying a program of instructions executable by the machine to perform method steps for representation of a region, said method steps comprising the steps of claim 1.

21. A method comprising:
forming a representation of locations of a plurality of geographical regions disaggregated into atomic components;
preparing a response to a spatial query involving determination of whether a point location intersects one of said geographical regions; and
preparing a response to said spatial query involving determination of whether any of said geographical regions intersect.

22. A method as recited in claim 21, wherein the step of forming a representation of regions disaggregated into atomic components includes segregating computations into off-line and on-line computations.

23. A method as recited in claim 22, further comprising employing said off-line computations in capturing at least one property of said atomic components.

24. A method as recited in claim 23, further comprising forming the atomic components into triangles based on Delaunay triangulation such that orientation of triangular regions with respect to a fixed axis are calculated via off-line computation.

25. A method as recited in claim 24, further comprising storing triangular atomic components as three orientation angles and three line segments.

26. An article of manufacture comprising a computer usable medium having computer readable program code means embodied therein for causing provision of a response to a metric query, the computer readable program code means in said article of manufacture comprising computer readable program code means for causing a computer to effect the steps of claim 21.

27. A program storage device readable by machine, tangibly embodying a program of instructions executable by the machine to perform method steps for provision of a response to a metric query, said method steps comprising the steps of claim 21.

28. An apparatus comprising means to perform the steps of claim 21.

29. An apparatus comprising:
means for preparing a representation of a region in anticipation of a query related to a metric space, said representation being used in forming a response to said query;
means for obtaining a mathematical format of a region within said metric space;
means for disaggregating said region into a set of atomic shapes; and
means for forming the representation of said region by preprocessing and storing at least one property for at least one of said atomic shapes.

30. An apparatus as recited in claim 29, further comprising means for prioritizing said atomic shapes according to at least one criterion.

31. An apparatus as recited in claim 29, further comprising means for transforming said mathematical format into a sequence of vertices.

32. An apparatus as recited in claim 29, further comprising means for forming a response to said query employing said representation.

33. A computer program product comprising a computer usable medium having computer readable program code means embodied therein for causing a representation of a region, the computer readable program code means in said computer program product comprising computer readable program code means for causing a computer to effect the functions of claim 29.

* * * * *